United States Patent
Allen et al.

(10) Patent No.: US 9,030,295 B2
(45) Date of Patent: May 12, 2015

(54) RFID TAG WITH ENVIRONMENTAL SENSOR

(71) Applicant: International Business Machines Corporation, Armonk, NY (US)

(72) Inventors: Ira L. Allen, Dallas, TX (US); Lawrence A. Clevenger, LaGrangeville, NY (US); Kevin S. Petrarca, Newburgh, NY (US); Carl J. Radens, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 13/772,651

(22) Filed: Feb. 21, 2013

(65) Prior Publication Data

US 2014/0232519 A1 Aug. 21, 2014

(51) Int. Cl.
*G05B 19/00* (2006.01)
*G05B 23/00* (2006.01)
*G08B 29/00* (2006.01)
*H04B 1/00* (2006.01)
*G06Q 30/02* (2012.01)
*G06Q 10/08* (2012.01)

(52) U.S. Cl.
CPC ............ *G06Q 30/0283* (2013.01); *G06Q 10/08* (2013.01)

(58) Field of Classification Search
USPC .......... 340/5.9, 780.07, 572.1–572.9, 870.07, 340/10.4, 10.1
See application file for complete search history.

(56) References Cited

U.S. PATENT DOCUMENTS

| | | | |
|---|---|---|---|
| 6,703,934 B1 * | 3/2004 | Nijman et al. | 340/572.1 |
| 7,149,658 B2 | 12/2006 | Kadaba | |
| 7,209,042 B2 | 4/2007 | Martin et al. | |
| 7,327,260 B2 | 2/2008 | Himberger et al. | |
| 7,517,146 B2 | 4/2009 | Smith et al. | |
| 7,564,364 B2 | 7/2009 | Zweig | |
| 7,667,604 B2 * | 2/2010 | Ebert et al. | 340/572.4 |
| 7,796,038 B2 | 9/2010 | Batra | |
| 7,891,310 B2 | 2/2011 | Taylor et al. | |
| 8,695,872 B2 * | 4/2014 | Braunstein | 235/379 |
| 8,786,440 B2 * | 7/2014 | Clare et al. | 340/572.1 |
| 2005/0108098 A1 * | 5/2005 | Syed et al. | 705/16 |
| 2005/0218208 A1 * | 10/2005 | Sugie et al. | 235/378 |
| 2006/0145863 A1 | 7/2006 | Martin et al. | |
| 2006/0214788 A1 | 9/2006 | Ku et al. | |
| 2006/0279527 A1 * | 12/2006 | Zehner et al. | 345/107 |
| 2007/0192216 A1 | 8/2007 | Arnold et al. | |

(Continued)

FOREIGN PATENT DOCUMENTS

EP 1155288 B1 5/2011

OTHER PUBLICATIONS

Dr.P.C.Jain, K.P.Vijaygopalan, "RFID and Wireless Sensor Networks", 2010, Proceedings of ASCNT—2010, CDAC, Noida, India, pp. 1-11.

*Primary Examiner* — Hoi Lau
(74) *Attorney, Agent, or Firm* — Michael A. Petrocelli; William Steinberg

(57) ABSTRACT

In a method for controlling pricing of a product, a radio frequency identification (RFID) tag having at least one processor is attached to a monitored product. A value indicative of a degree of exposure to an environmental condition is obtained. The obtained value is compared with a predetermined value range. A price of the monitored product is adjusted when the result of the comparison falls outside the predetermined value range.

17 Claims, 4 Drawing Sheets

(56) References Cited

U.S. PATENT DOCUMENTS

| | | | |
|---|---|---|---|
| 2007/0245947 A1 | 10/2007 | Riemelmoser | |
| 2008/0143532 A1* | 6/2008 | Murrah | 340/572.4 |
| 2008/0197193 A1* | 8/2008 | Overhultz et al. | 235/383 |
| 2008/0204268 A1* | 8/2008 | Dowling et al. | 340/815.45 |
| 2009/0026274 A1* | 1/2009 | Gelbman | 235/492 |
| 2009/0063227 A1* | 3/2009 | Choi et al. | 705/7 |
| 2009/0309736 A1* | 12/2009 | Heurtier | 340/572.8 |
| 2010/0117819 A1* | 5/2010 | Murray | 340/517 |
| 2010/0332407 A1 | 12/2010 | Grieve et al. | |
| 2011/0080267 A1* | 4/2011 | Clare et al. | 340/10.4 |
| 2011/0169636 A1 | 7/2011 | Kadaba | |
| 2011/0266338 A1* | 11/2011 | Babcock et al. | 235/375 |
| 2011/0303829 A1 | 12/2011 | Tio Castro et al. | |
| 2012/0004771 A1* | 1/2012 | Walker et al. | 700/236 |
| 2012/0271777 A1 | 10/2012 | Kadaba | |
| 2013/0144757 A1* | 6/2013 | Bauer et al. | 705/26.61 |
| 2013/0214938 A1* | 8/2013 | Kim et al. | 340/870.07 |
| 2014/0224867 A1* | 8/2014 | Werner et al. | 235/375 |
| 2014/0232519 A1* | 8/2014 | Allen et al. | 340/5.9 |

\* cited by examiner

RFID TAG WITH ENVIRONMENTAL SENSOR

TECHNICAL FIELD

The present invention relates generally to RFID tags and more specifically to RFID tags having one or more environmental sensors.

BACKGROUND

Active RFID tags are well known today. For example, the Matrics Group manufactures "MicroSensys™" Active RFID tags, and KSW Microtec manufactures "Smart Active Label™" Active RFID tags. An active RFID tag includes a small battery, and transmits RF signals via an integral antenna. The battery adds significant cost to the RFID tag. The RFID may be preprogrammed with information that represents, for example, the identity of the product which bears the RFID tag. The transmitted RF signals typically include the identity of the active RFID tag. If the active RFID tag includes additional data, the active RFID tag may transmit the data as well. An active RFID tag can effectively transmit to a receiver up to 100 meters away.

Passive RFID tags are also well known today. A passive RFID tag does not include a battery; instead, the passive RFID tag has an integral antenna which receives RF signals from an active RFID tag or remote transceiver. The transmitted RF signals power the passive RFID tag, i.e. the passive RFID tag captures the energy of the RF signals which it receives and uses the energy to drive transceiver and other circuitry on the passive RFID tag. The transceiver circuitry on the passive RFID tag transmits information, such as the identity coded into the passive RFID to identify the product which bears the passive RFID tag. The passive RFID tag may also include a memory to store any type of information transmitted by the active RFID tag or other remote transceiver. Typically, passive RFID tags have a range of about three meters.

It was also known for an active or passive RFID tag to include an environmental sensor, such as a temperature or humidity sensor. For example, the Matrics Group MicroSensys™ active RFID tags and KSW Microtec Smart Active Label™ active RFID tags include temperature sensors. The temperature sensor measures the ambient temperature, and circuitry on the RFID tag containing the sensor records information about the temperature. For example, if the RFID tag is attached to a temperature sensitive product such as a food package, the RFID tag will record whether the food was exposed to excessively hot or cold temperatures during shipment. The active RFID tag may also periodically record temperature samples over time.

SUMMARY

In one aspect, a method for controlling pricing of a product is provided. The method comprises attaching a radio frequency identification (RFID) tag having at least one processor to a monitored product. The method further comprises obtaining a value indicative of a degree of exposure to an environmental condition. The method further comprises comparing the obtained value with a predetermined value range. The method further comprises adjusting a price of the monitored product when the result of the comparison falls outside the predetermined value range.

In another aspect, a computer program product for controlling pricing of a product using a radio frequency identification (RFID) tag attached to a monitored product is provided. The computer program product comprises one or more computer-readable tangible storage devices and program instructions stored on at least one of the one or more computer-readable tangible storage devices. The program instructions are executable by the RFID tag. The program instructions comprise program instructions to measure a value indicative of a degree of exposure to an environmental condition. The program instructions further comprise program instructions to compare the measured value with a predetermined value range. The program instructions further comprise program instructions to adjust a price of the monitored product when the result of the comparison falls outside the predetermined value range.

In another aspect, a computer system for controlling pricing of a monitored product using a radio frequency identification (RFID) tag attached to the monitored product is provided. The computer system comprises RFID tag having one or more processors, one or more computer-readable memories, one or more computer-readable tangible storage devices, and program instructions stored on at least one of the one or more storage devices for execution by at least one of the one or more processors via at least one of the one or more memories. The program instructions comprise program instructions to measure a value indicative of a degree of exposure to an environmental condition. The program instructions further comprise program instructions to compare the measured value with a predetermined value range. The program instructions further comprise program instructions to adjust a price of the monitored product when the result of the comparison falls outside the predetermined value range.

In yet another aspect, a method for adjusting certified potency of a product is provided. The method comprises attaching a radio frequency identification (RFID) tag having at least one processor to a monitored product. The method further comprises obtaining a value indicative of a degree of exposure to an environmental condition. The method further comprises comparing the obtained value with a predetermined value range. The method further comprises adjusting a certified potency of the monitored product when the result of the comparison falls outside the predetermined value range.

DETAILED DESCRIPTION

An embodiment of the present invention provides means for automatically adjusting a price of a product when the product has been exposed to adverse environmental conditions for a predetermined period of time. Embodiments described herein will have numerous applications; however, at least some embodiments will be particularly useful in relation to packaged food products including dairy products such as milk.

Milk is commonly sold in cardboard cartons and safe handling practices, as well as Government regulations, require that such products not be exposed to temperatures above a predetermined level for a set length of time. In the case of milk, the product should not be exposed to temperatures above 5° C. for more than 15 minutes. The industry meets these requirements by ensuring that such products are always stored or kept in adequate refrigerated conditions. However, this is not always possible, particularly during transport and delivery of such products. Accordingly, despite best endeavors, it is still possible for such products to be exposed to elevated temperatures well beyond stipulated time even though the conditions of transport and storage meet the legal requirements.

Accordingly, an embodiment of the present invention provides means to measure environmental conditions, to detect departure from allowable limits, and to automatically adjust purchase prices of retail products when such products have been subject to adverse environmental conditions for a time that is greater than allowable. Alternatively, such products may be flagged as unacceptable for sale, based on criteria provided by a supplier.

Another embodiment of the present invention provides means for automatically indicating a relative and/or remaining potency of a product, such as chemical and pharmaceutical products, when the product has been exposed to adverse environmental conditions that might degrade the quality of the product. For example, hydrogen peroxide is a widely used oxidant. Although concentrated solutions of hydrogen peroxide are stable, diluted hydrogen peroxide solutions with even trace level of impurities present tend to degrade significantly during storage or use. Possible causes of the degradation include exposure to heat and radiation. Such adverse environmental conditions can render the solutions unstable resulting in the decomposition of the hydrogen peroxide into water and oxygen during transportation or storage. Accordingly, an embodiment of the present invention provides means to certify potency of the product based on observed environmental conditions.

Figure 1:
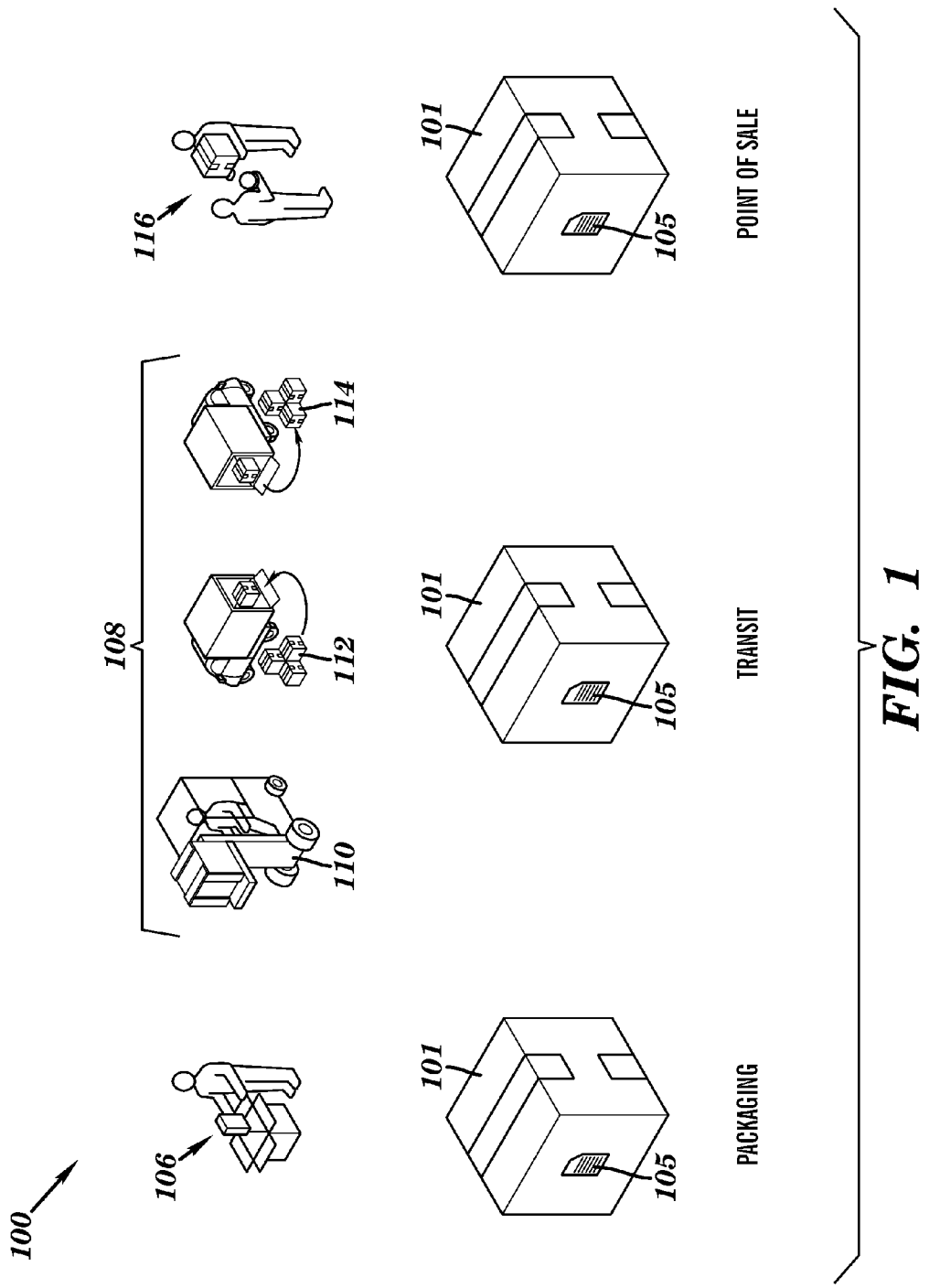
FIG. 1 is a pictorial representation of a product delivery system that employs environmental sensor technology to measure monitored product environment data in accordance with an embodiment of the present invention.

With reference to FIG. 1, an illustrative diagram of a product delivery environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made. Like numbers refer to like elements throughout. The embodiments described herein provide means for measuring the environmental conditions to which a monitored product has been subjected during its movement through a supply chain and provide means for adjusting a purchase price of the monitored product based on a degree of exposure to the environmental condition.

The term "container" will be used herein to refer to virtually any object that can be used to enclose or hold a product, such as, for example, but not limited to, an envelope, packet, mailing tube, bag, box, package, can, bucket, crate, palate, shipping container, and the like.

FIG. 1 is a pictorial representation of a product delivery system 100 that employs environmental sensor technology to measure monitored product environment data in accordance with an embodiment of the present invention. The product delivery system 100 includes an RFID tag 105 physically attached to a product in a container 101 that is to be shipped from, for example, a manufacturer of the product to a receiver. As referred to herein, an RFID tag is an automated data collection device having an integrated environmental sensor. As is known in the art, RFID technology provides a wireless means of automated data collection that eliminates the need for a direct line of sight between a data reader and the RFID tag. This allows the RFID tag 105 to be placed anywhere on or in the monitored product or the container 101. In other words, the RFID tag 105 can be placed inside the container 101, it can be affixed to an outer surface of the container 101 (as shown in FIG. 1), or it can be positioned directly on the product that is inside the container 101, for example. An RFID tag 105 can be an active RFID tag 200, described below in conjunction with FIG. 2 or passive RFID tag 300 depending on whether they have an on-board power source or not. The environmental sensor portion 222 of the RFID tag 105 is described further below in conjunction with FIGS. 2 and 3.

In one embodiment, product environment data measurements can be collected by the RFID tag 105 that is physically associated with a monitored product at one or more points along the shipping route. For example, the RFID tag 105 may be attached to the monitored product when it is placed in a container or package 101 for shipment. In this illustrative embodiment, the RFID tag 105 may also be used for keeping track of inventory and other functions related to product delivery.

According to another embodiment of the invention, the RFID tag 105 may be fixed to components or products for keeping track of environmental conditions during manufacturing process and/or post-manufacturing functions. In this embodiment the post-manufacturing use of the RFID tag 105 can also relate to specific information carried by the tag, such as lot number, expiration date, and calibration.

Calibration may be important for a number of products that inevitably vary somewhat during manufacturing and/or movement through a supply chain (delivery system), and thus need a calibration number for proper use by the customer. One example is electronic components; another is dry reagent testing strips (such as glucose test strips), which have variation and need to carry a calibration indication. The calibration number or code (which can be encoded in the RFID tag 105) may enable a reader to determine the specific characteristics of the test strip, as well as where the strip came from, the expiration date of the strip, whether this is the correct strip for the test to be conducted, and the like. This information may be important for accuracy and automatic calibration in post-manufacturing use. The objective of attaching the RFID tag 105 is that the dry reagent test strip carries all critical information directly on the strip, to enable automatic calibration, tracking, checking and tracing of these strips, thus eliminating human error. The same tag, pursuant to an embodiment of the present invention, can be used for tracking environmental conditions during the manufacturing process, to be sure that each strip has not been exposed to environmental conditions that might have affected its potency/purity. It is thus among the objects of various embodiments of the present invention to provide and establish RFID tag 105 that is embedded in or carried on products or components, and the RFID tag 105 carries critical environmental condition measurements as the product progresses in the manufacturing procedure and/or progresses through the shipping route.

Referring back to an embodiment illustrating the product delivery system 100, when the RFID tag 105 is attached to the container 101, a first environmental condition measurement (baseline) can be made and stored in the RFID tag 105 along with other information, such as calibration data. Additional environmental condition measurements can be made during various transit points 108. For example, if the monitored product is stored in a warehouse before delivery, one or more environmental condition measurements may be obtained while the product is stored in the warehouse 110.

Once a designated delivery location is identified, a monitored product to be shipped may be moved to a designated place for pickup 112 by a carrier for delivery to receiver. A delivery vehicle may then transport the container 101 and product therein to the receiver's location 114 to complete delivery of the product in its container. The receiver can then open the container, retrieve the product and subsequently sell it to the end user of the monitored product. Alternatively, prior to the final delivery, the container 101 with the product can be transported via aircraft, train, and the like to a hub near the receiver's location. As the product in the container 101 is transported and stored from the packaging location 106 to the point of sale location 116, the environmental sensors integrated with the RFID tag 105 may collect environmental data describing one or more environmental conditions to which the monitored product has been subjected prior to sale.

The type of environmental data obtained from the environmental sensor integrated with the RFID tag 105 may depend on the type of sensor used. Preferably, the environmental sensor described herein may be capable of sensing one or more environmental conditions such as gamma radiation, x-ray radiation, extreme temperature, smoke plume, pressure, vacuum, vibration, shock, humidity, moisture, light, air, and the presence or absence of a particular chemical. In one embodiment, the RFID tag 105 is operable to generate and store time data in association with product environment data for indicating the time of sensing the environment condition associated with the container 101 and the product contained therein.

In one embodiment, the environmental data may be read wirelessly when the RFID tag comes within range of an RFID interrogating device, such as a cash register equipped with RFID technology (i.e. RFID reader). In another embodiment, the environmental data may be read by an RFID reader at a chemical plant, for example, to determine remaining potency of the product in order to select an appropriate product delivery or storage method to prevent further degradation of the product.

In other words, the RFID tag having an environmental sensor can be used to record historical data of the environmental conditions that a product and/or container 101 is exposed to during transport, manufacturing, storage, and the like. This capability to verify that one or more environmental conditions have been maintained during manufacturing, storage, and transport can be important when shipping a variety of products that require special handling. A few examples of products that may require special handling because of their sensitivity to temperature, pressure, light, moisture, radiation and/or other environmental conditions include pharmaceuticals, biological tissue, perishable foods, and the like.

As mentioned above, a record of the environmental conditions to which a monitored product has been subjected during shipment and storage or during manufacturing process can be obtained by the RFID tag 105 that may sense the environmental condition periodically or otherwise along its route and may store sensed product environment data for later analysis. It should be noted that if the RFID tag is implemented as a passive RFID tag 300, it may log excursions above and/or below predetermined environmental condition thresholds. Alternatively, if periodic sampling of environmental conditions is important, the RFID tag 105 may be implemented as an active RFID tag 200.

How frequently the environmental sensor should sample and store measurements can be determined in a variety of ways and is an implementation decision. In general, the sampling period of the environmental sensor should be less than the time required for the monitored product to spoil when exposed to the environmental condition. Thus, for example, if the monitored product will be spoiled by exposure to an unacceptable environmental condition for a few seconds, then the environmental sensor should be capable of taking environment condition measurements at least every second or less. Similarly, if the monitored product will spoil if exposed to an unacceptable environmental condition continuously over several hours, then the environmental sensor can take product environmental data readings on an hourly basis, for example.

Spoilage of a product can also depend not only on the time for which the product has been exposed to an unacceptable environmental condition, but also upon the severity level of the environmental condition. Hence, in some embodiments of the present invention, the RFID tag 105 may be configured to take environmental condition measurements more frequently if an environmental condition is relatively severe, and less frequently if the environmental condition to which the product is exposed is less severe. By storing the product environmental data readings in correspondence with the time at which such readings were taken, the active RFID tag, such as tag 200, may use this historical information to adjust a purchase price of the monitored product at the point of sale 116 based on the duration and/or the severity level of the environmental condition to which the monitored product has been exposed, as described below in conjunction with FIG. 4. In another embodiment, the environmental data may be analyzed to determine and report the remaining potency level of the monitored product when the RFID tag comes within range of an RFID interrogating device (i.e. RFID reader) in a manufacturing environment.

Figure 2:
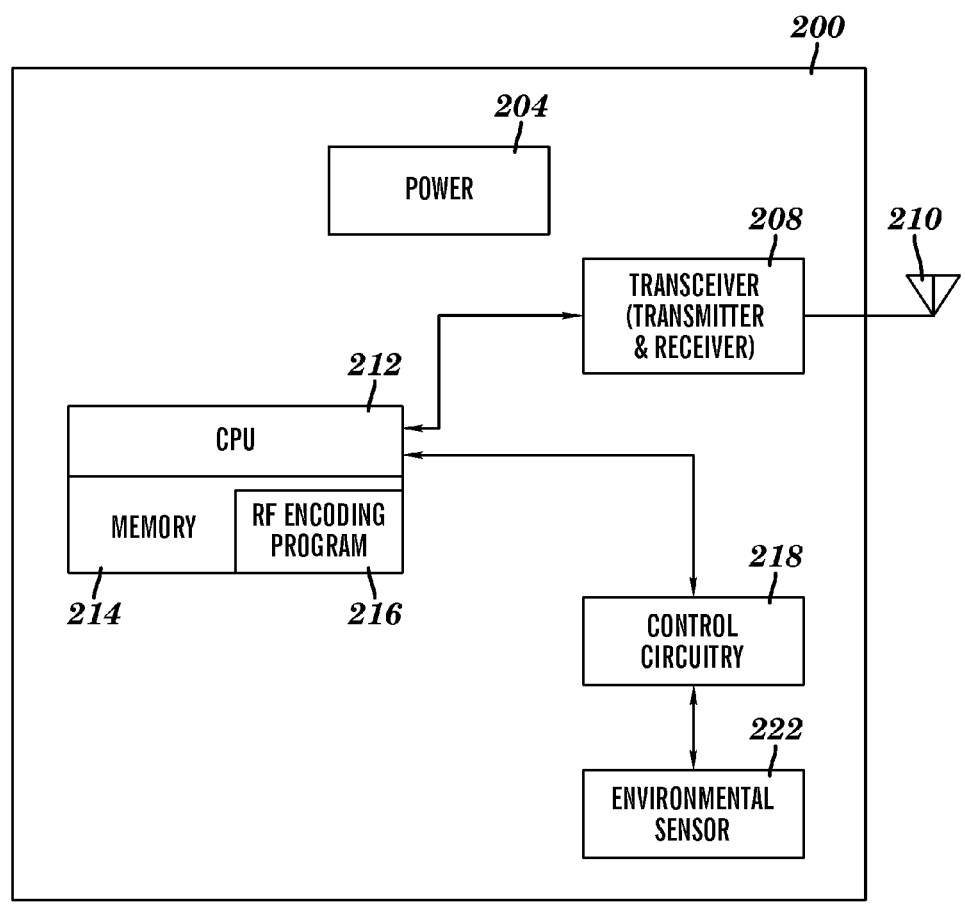
FIG. 2 is a block diagram of an active RFID tag with an environment sensor physically attached to a monitored in accordance with an embodiment of the present invention.

In various embodiments of the present invention, the RFID tag 105 may represent an active RFID tag. FIG. 2 is a block diagram of an active RFID tag with an environment sensor which may be physically attached to a monitored product, in accordance with an embodiment of the present invention. Active RFID tag 102 may include known type of environmental sensor 222. Preferably, the environmental sensor described herein may be capable of sensing one or more environmental conditions such as gamma radiation, x-ray radiation, extreme temperature, smoke plume, pressure, vacuum, vibration, shock, humidity, moisture, light, air, and the presence or absence of a particular chemical.

In accordance with an embodiment of the present invention, the active RFID tag 200 may further include power source 204 (such as a Lithium-Ion battery), electronic transceiver circuitry 208, antenna 210, integrated circuit CPU 212, and memory 214 (such as EEPROM or SRAM). The active RFID tag 200 may also include electronic control circuitry 218 and RF encoding program 216 in memory 214, according to an embodiment of the present invention. The transceiver 208 may include a transmitter and a receiver coupled to the antenna 210 to transmit and receive RF signals. In an embodiment, the control circuitry 218 may be coupled to the environmental sensor 222 and may provide information regarding measured environmental conditions to the CPU 212 for storage in the memory 214. For example, the control circuitry 218 may periodically monitor the environmental sensor 222, compare the monitored environmental condition samples to predetermined upper and lower threshold limits, and report to the CPU 212 if and when the sensed environmental measurement is, for example, above the upper limit or below the lower limit.

According to an embodiment of the present invention, the RF encoding program 216 may execute on the CPU 212 to adjust a price of the monitored product, for example, based on the historical environmental information stored in the memory 214 and to broadcast the determined value to an interrogating device, as described below in conjunction with FIG. 4. According to an embodiment of the present invention such signal may be transmitted, for instance, when addressed by a RFID reader. For example, the RF encoding program 216 may determine that the environmental condition to which the monitored product has been exposed has transcended a minimum or maximum limit or range, based on the product environment data detected by the environmental sensor 222. When an end user attempts to purchase the monitored product, for example at a supermarket, the monitored product may be scanned at a cash register equipped with an RFID reader. In the illustrated scenario, in response to receiving a signal from the cash register's RFID reader, according to an embodiment of the present invention, the active RFID tag 102 may transmit a purchase price value equal to zero indicating unacceptable quality of the monitored product due to exposure to an adverse environmental condition. This capability has numerous benefits, including preventing a sale of the product not suitable for use by the end user. In accordance with another embodiment of the present invention, in response to receiving a signal from the interrogating RFID reader device, the RF encoding program 216 may determine and report the remaining potency level of the monitored product.

Figure 3:
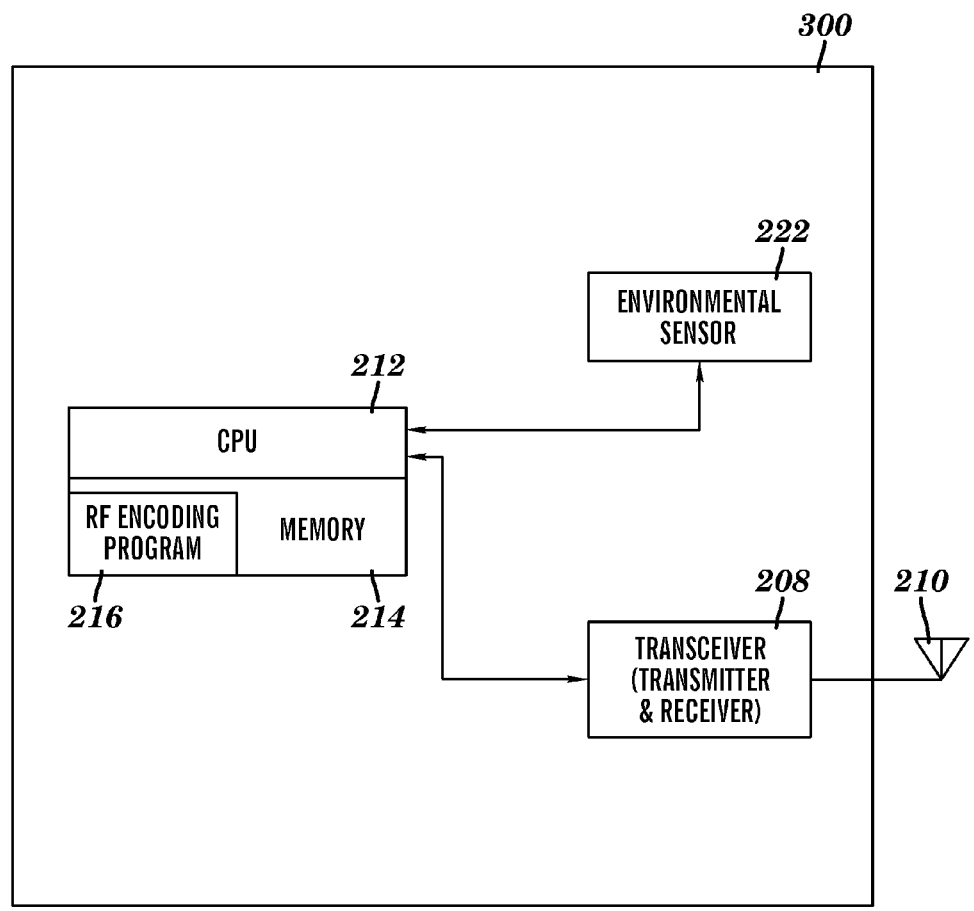
FIG. 3 is a block diagram of a passive RFID tag with an environment sensor physically attached to a monitored product in accordance with another embodiment of the present invention.

FIG. 3 is a block diagram of a passive RFID tag with an environmental sensor which may be physically attached to a monitored product of the product delivery system of FIG. 1 in accordance with another embodiment of the present invention. The passive RFID tag 300 may include known types of CPU 212, memory 214 (such as EEPROM or SRAM), transceiver 208, antenna 210 for the transmitter and receiver and environmental sensor 222. At least in some embodiments, the environmental sensor 202 may be well-known in the art chemically based sensor that may be operable to detect, for example, monitored material phase transition/transformation.

In one specific example, the environmental sensor 222 may be a temperature sensor employing one or more heat sensitive fuses. A suitable device for this purpose may include a circuit as the recording mechanism and fuses in the circuit as the sensor. When a first threshold temperature is exceeded, a fuse opens at least one path through the circuit, thus changing the state of the recording mechanism. In one embodiment, opening the path changes the resonance frequency of the circuit. When a second threshold temperature is exceeded, a second fuse may open another path through the circuit, thus changing the state of the recording mechanism in a different manner than for the first threshold temperature. Similarly, when temperature decreases below a low-temperature threshold, a liquefied material may freeze, thereby changing a circuit path from open to closed (or vice versa) as above. Information stored by the recording mechanism may be utilized by the RF encoding program 216, as described below in conjunction with FIG. 4. Temperature sensitive materials for the one or more fuses may be selected based upon the characteristics of the product or component to be monitored.

Some examples of fusible alloys that can be employed for the temperature sensor with their composition in weight-percent and melting points shown in parenthesis include, but are not limited to, Cs 73.71 K 22.14 Na 4.14 (−78.2° C.), Hg 91.5 Tl 8.5 (−58° C.), Hg 100 (−38.8° C.), Cs 77.0 K 23.0 (−38.8° C.), K 78.0 Na 22.0 (−11° C.), Ga 62.5 In 21.5 Sn 16.0 (10.7° C.), Ga 75.5 In 24.5 (15.7° C.), Ga 100 (29.8° C.), Bi 32.5 In 51.0 Sn 16.5 (60.5° C.), Bi 50.0 Pb 25.0 Sn 12.5, Cd 12.5 (71° C.), Bi 50.0 Pb 31.2 Sn 18.8 (97° C.), Bi 56.5 Pb 43.5 (125° C.), Sn 62.3 Pb 37.7 (183° C.), and Sn 91 Zn 9 (198° C.). In other embodiments a variety of brittle materials may be employed for environmental sensing purposes. Thus, in the passive RFID tag 300 the environmental sensor component 222 may also be passive.

As previously indicated, passive RFID tags 300 do not require battery for transmission since generally, they are powered by the reader using an induction mechanism (an electromagnetic field is emitted by the reader antenna and received by the antenna, such as antenna 210, localized on the passive RFID tag). This power may be used by the passive RFID tag 300 to obtain environmental data from the environmental sensor 222, invoke the RF encoding program 216 which may execute on the CPU 212 to read and analyze the environmental data and transmit a signal back to the reader, carrying the data, such as, for example, a discounted purchase price value or remaining potency value. It should be noted that if the RFID tag 300 employs chemically-based environmental sensor 222 capable of measuring various stages of material deterioration, such RFID tag 300 may not necessarily need power to collect environmental data. The memory 214 may contain the RF encoding program 216.

Figure 4:
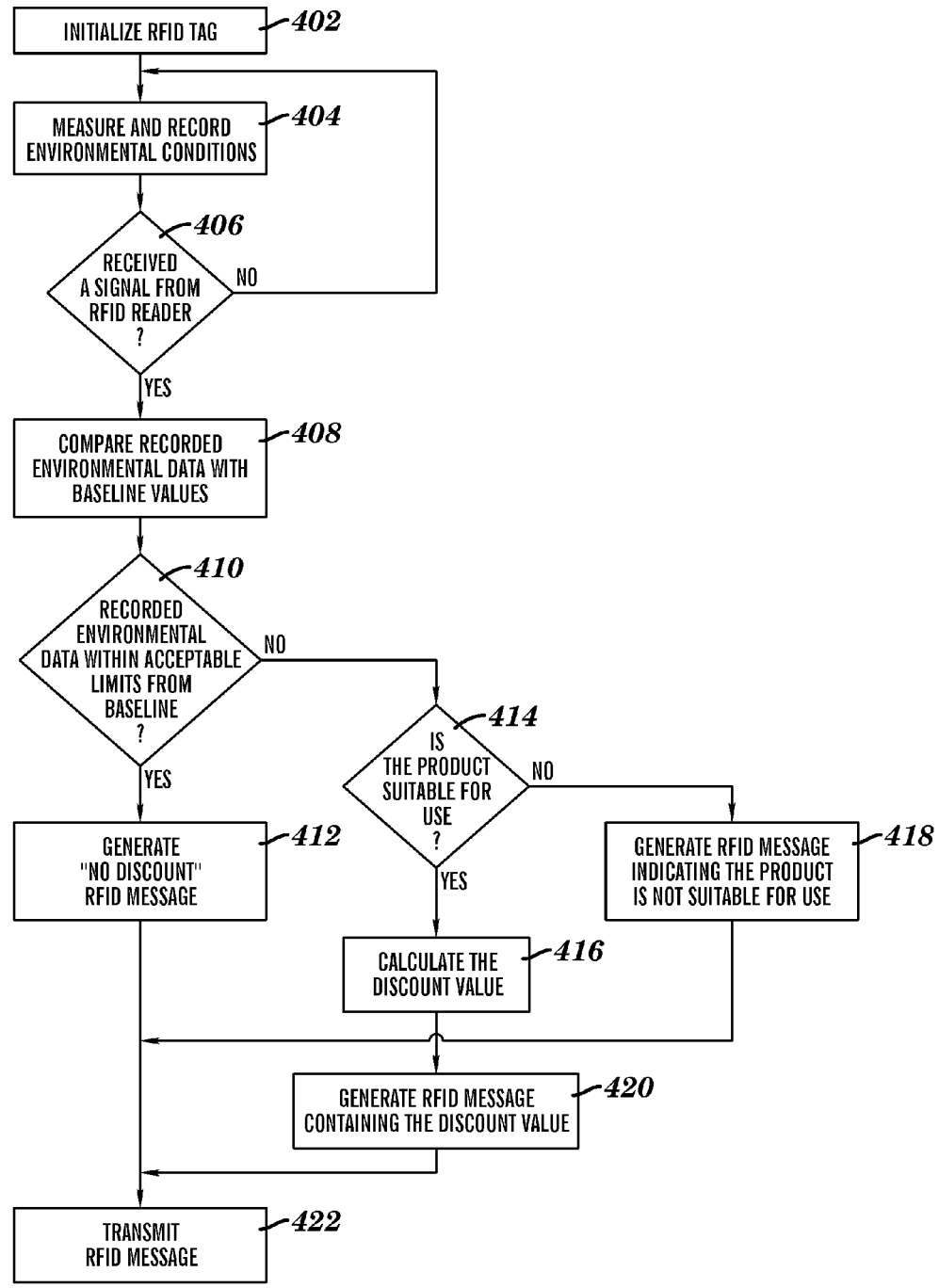
FIG. 4 is a flowchart of the operation of an RF encoding program embedded within an active RFID tag of FIG. 2 and/or a passive RFID tag of FIG. 3 in accordance with an embodiment of the present invention.

FIG. 4 is a flowchart of the operation of an RF encoding program embedded within an active RFID tag of FIG. 2 and/or a passive RFID tag of FIG. 3 in accordance with an embodiment of the present invention. It should be appreciated that FIG. 4 is only provided as an illustration of one implementation of RF encoding program and is not intended to imply any limitation with regard to the environments in which different embodiments may be implemented. At 402, when an RFID tag 105 such as either active RFID tag 200 or passive RFID tag 300 is attached to a particular product item, in an embodiment of the present invention, the corresponding RF encoding program 216 may initialize the RFID tag 105 by, for example, establishing baseline values. In an embodiment of the present invention, environmental sensor 222 may optionally include a plurality of reference elements (not shown). It should be noted that environmental sensor 222 need not have a reference element. Reference elements may enable the cross validation of environmental data and may establish baselines. This may be important for chemical measurements, for biological environmental sensors, and for any sensor that measures two or more variables and at least one of the variables is dependent on or proportional to the other. In an embodiment of the present invention, environmental sensor 222 may have a plurality of associated reference elements. In an embodiment, a reference element provides a predetermined baseline and/or calibrated value to which environmental data subsequently obtained by the environmental sensor 222 can be compared internally. In an embodiment, the predetermined baseline values may be initialized by employing a calibration signal transmitted, for example by a RFID reader. In an embodiment of the present invention, in response to receiving a calibration signal, RF encoding program 216 may store the baseline values in memory 214.

At 404, as the product with the attached RFID tag 101 is transported and stored from the packaging location 106 to the point of sale location 116, environmental sensor 222 may take a plurality of environmental measurements describing environmental conditions to which the monitored product has been subjected prior to sale. In an embodiment of the present invention periodic measurements may be taken by an active RFID tag 200 and each measurement may be stored, for example as historical data, in memory 214 along with time data indicating the time of sensing the environment condition. In an alternative embodiment, product manufacturer may provide an upper and lower product degradation thresholds. In this embodiment, an obtained environmental condition value may be stored in memory 214 when it crosses the upper or lower product degradation threshold. For example, environmental data may include cumulative deviation from upper and/or lower degradation threshold. As indicated above, environmental sensor 222 may sense the environmental condition periodically or otherwise along the product route to a point of sale terminal, such as cash register. How frequently the environmental sensor should sample and store measurements can be determined in a variety of ways and is an implementation decision. Alternatively, in a manufacturing environment, RFID tag 105 may take environmental measurements during various stages of manufacture.

Next, RF encoding program 216 may continue storing obtained environmental data (decision 406, no branch) until RF encoding program 216 detects a signal transmitted by an interrogating RFID reader, such as a point of sale system with a connected RFID reader, (decision 406, yes branch). Such interrogating signal may either energize passive RFID tag 300 or wake up active RFID tag 200 depending on the particular type of RFID tags being implemented. In response to receiving the signal from the interrogating RFID tag reader, at 408, RF encoding program 216 may perform a comparison between the stored baseline data and recorded environmental data. For instance, RF encoding program 216 may compare baseline value with a cumulative deviation value.

According to an embodiment of the present invention, at 410, RF encoding program 216 may determine whether the environmental conditions to which a monitored product has been subjected during its movement through a supply chain (recorded environmental data) are within acceptable limits from baseline values. For example, if the monitored product/material loses its effectiveness (e.g. potency) at 40° F. but becomes unusable once it is exposed to 32° F., RF encoding program 216 may determine that the temperature exposure is within acceptable limits when recorded temperature is in the range of 41° F. to 33° F. In various embodiments, the acceptable range of environmental measurement values may be implementation decision and may be provided by a product manufacturer.

In an embodiment of the present invention, in response to determining that environmental conditions had no adverse effects on the quality of monitored product (decision 410, yes branch), at 412 RF encoding program 216 may generate an RFID message indicating no discount should be applied to a predetermined purchase price of the monitored product. Continuing with the above example, the RF encoding program 216 may generate this message if the recorded temperature value is above the potency level threshold (40° F.). In an embodiment, the generated RFID message may include other data associated with the monitored product stored in memory 214. Such information may include, for example, product manufacturer/supplier code, date information, and the like.

In response to determining that the environmental conditions to which a monitored product has been subjected during its movement through a supply chain or manufacturing are not within acceptable limits from baseline values (decision 410, no branch), RF encoding program 216 may next determine, at 414, whether the monitored product is suitable for use by a product end user. In an embodiment of the present invention, RF encoding program 216 may determine whether the exposure to adverse environmental conditions may have caused an irreversible degradation of the monitored product. In various embodiments the method of determining the remaining effectiveness (potency) of the product may be product specific and may be implemented based on one or more criteria provided by the product manufacturer/supplier. According to an embodiment of the present invention, in response to determining that the monitored product is not suitable for use (decision 414, no branch), RF encoding program 216 may generate (at 418) RFID message indicating unacceptable quality of the monitored product in order to prevent any sale of such product. Continuing with the above example, the RF encoding program 216 may be generated when the monitored product has been exposed to temperatures equal to or below 32° F. In an embodiment, the RFID message generated by the RF encoding program 216 at 418 may include, for example, a purchase price value equal to zero. In addition, such message may include other data, such as environmental data associated with an adverse environmental condition that may have caused degradation of the product. Such information may include, for example, stored time data indicating the time of sensing the adverse environmental condition. The RF encoding program 216 may retrieve this data from the memory 214 prior to generating the message.

In response to determining that the monitored product is suitable for sale despite the exposure to the adverse environmental conditions (decision 414, yes branch), such as recorded temperature exposure is in the range of 39° F. to 33° F. in the above example, the RF encoding program 216 may next determine, at 416, a discount value corresponding to a degradation level and/or remaining potency of the monitored product. In a preferred embodiment, the discount value may be calculated based on a sliding scale dependent upon the magnitude and/or duration of the exposure. In the preferred embodiment a linear sliding scale may be used. Next, at 420, RF encoding program 216 may generate a corresponding RFID message which may include the discount value and/or remaining potency of the monitored product (if used in manufacturing environment) as determined by the RF encoding program 216.

In accordance with an embodiment of the present invention, once RF encoding program 216 generates at least one of the RFID messages described above (at 412, 418 or 420), at 422, the RF encoding program 216 may transmit the generated message, as an RF signal, to the RFID tag reader integrated with a point of sale system, as a response to the interrogation signal received at 406. In an embodiment, RF encoding program 216 may employ transceiver 208 to transmit the RF signal.

In summary, RFID tags described herein when attached to a monitored product provide capability of adjusting a purchase price of the monitored product based on various environmental data stored in such tags without interacting with any external system. Alternatively, RFID tags described herein may provide information related to the remaining potency of the monitored product. According to an embodiment of the present invention, the RFID tags 200, 300 may be configured and/or certified by a product manufacturer. This pre-approved configuration may advantageously sufficiently minimize any non-approved variations in the price adjustments. The selection of active 200 or passive 300 RFID tags for a particular application can depend upon one or more of the above stated considerations regarding RFID tags, product characteristics, environmental sensors, and their operation.

The one or more RF encoding program 216 may be stored on one or more of the computer-readable tangible storage devices for execution by one or more of the processors 212 via one or more of the memories 214 (which typically include cache memory). In the embodiment illustrated in FIGS. 2 and 3, each of the computer-readable tangible storage devices is a semiconductor storage device such as ROM, EPROM, flash memory or any other computer-readable tangible storage device that can store a computer program and digital information. The RF encoding program 216 can be loaded into one or more computer-readable tangible storage devices from an external computer.

RF encoding program 216 can be written in various programming languages including low-level, high-level, object-oriented or non object-oriented languages. Alternatively, the functions of RF encoding program 216 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for controlling pricing of a product, the method comprising:
    attaching a radio frequency identification (RFID) tag having at least one processor to a monitored product;
    measuring a value indicative of a degree of exposure to an environmental condition using the RFID tag;
    the at least one processor comparing the measured value of the environmental condition with a predetermined value range stored on the RFID tag wherein the RFID tag comprises an environmental sensor configured to measure exposure to the environmental condition;
    generating a price value based on the degree of exposure to the environmental condition using the at least one processor on the RFID tag, the price value includes comparing the predetermined value range with recorded environmental data, the price value further including comparison of the degree of exposure to the environmental condition and predetermined upper and lower threshold limits stored on the RFID tag; and
    adjusting a price of the monitored product based on the price value using the at least one processor when the result of the comparison falls outside the predetermined value range.

2. The method of claim 1, wherein the RFID tag is a passive RFID tag.

3. The method of claim 1, wherein the RFID tag is an active RFID tag.

4. The method of claim 1, wherein the environmental condition comprises at least one of gamma radiation, x-ray radiation, extreme temperature, smoke plume, pressure, vacuum, vibration, shock, humidity, moisture, light, air, and a chemical to which the monitored product has been subjected.

5. The method of claim 1, further comprising transmitting the adjusted price to an RFID interrogator.

6. A computer program product for controlling pricing of a monitored product using a radio frequency identification (RFID) attached to the monitored product is provided, the computer program product comprising one or more computer-readable tangible storage devices and program instructions stored on at least one of the one or more computer-readable tangible storage devices, the program instructions executable by the RFID tag, the program instructions comprising:
    program instructions to measure a value indicative of a degree of exposure to an environmental condition using the RFID tag;
    program instructions to compare the measured value of the environmental condition with a predetermined value range stored on the RFID tag wherein the RFID tag comprises an environmental sensor configured to measure exposure to the environmental condition;
    generating a price value based on the degree of exposure to the environmental condition using the at least one processor on the RFID tag, the price value includes comparing the predetermined value range with recorded environmental data, the price value further including comparison of the degree of exposure to the environmental condition and predetermined upper and lower threshold limits stored on the RFID tag; and
    program instructions to adjust a price of the monitored product based on the price value using the at least one processor when the result of the comparison falls outside the predetermined value range.

7. The computer program product of claim 6, wherein the RFID tag is a passive RFID tag.

8. The computer program product of claim 6, wherein the RFID tag is an active RFID tag.

9. The computer program product of claim 6, wherein the environmental condition comprises at least one of gamma radiation, x-ray radiation, extreme temperature, smoke plume, pressure, vacuum, vibration, shock, humidity, moisture, light, air, and a chemical to which the monitored product has been subjected.

10. The computer program product of claim 6, further comprising program instructions to transmit the adjusted price to an RFID interrogator.

11. A computer system for controlling pricing of a monitored product using a radio frequency identification (RFID) tag attached to the monitored product is provided, the computer system comprising the RFID tag having one or more processors, one or more computer-readable memories, one or more computer-readable tangible storage devices, and program instructions stored on at least one of the one or more storage devices for execution by at least one of the one or more processors via at least one of the one or more memories, the program instructions comprising:
    program instructions to measure a value indicative of a degree of exposure to an environmental condition using the RFID tag;
    program instructions to compare the measured value of the environmental condition with a predetermined value range;
    generating a price value based on the degree of exposure to the environmental condition using the at least one processor on the RFID tag, the price value includes comparing the predetermined value range with recorded environmental data, the price value further including comparison of the degree of exposure to the environmental condition and predetermined upper and lower threshold limits stored on the RFID tag; and
    program instructions to adjust a price of the monitored product based on the price value using the at least one processor when the result of the comparison falls outside the predetermined value range.

12. The computer program product of claim 11, wherein the RFID tag is a passive RFID tag.

13. The computer program product of claim 11, wherein the RFID tag is an active RFID tag.

14. The computer program product of claim 11, wherein the environmental condition comprises at least one of gamma radiation, x-ray radiation, extreme temperature, smoke plume, pressure, vacuum, vibration, shock, humidity, moisture, light, air, and a chemical to which the monitored product has been subjected.

15. The method of claim 1, wherein the price value includes determining the monitored product is not suitable for use, or a discount value for the monitored product, or the monitored product is not discounted.

16. The computer program product of claim 6, wherein the price value includes determining the monitored product is not suitable for use, or a discount value for the monitored product, or the monitored product is not discounted.

17. The computer program product of claim 11, wherein the price value includes determining the monitored product is not suitable for use, or a discount value for the monitored product, or the monitored product is not discounted.

* * * * *